(12) United States Patent
Kanenari

(10) Patent No.: US 8,736,435 B2
(45) Date of Patent: May 27, 2014

(54) TIRE INFORMATION MONITORING SYSTEM AND SETTING METHOD FOR A TIRE INFORMATION MONITORING SYSTEM

(75) Inventor: Daisuke Kanenari, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 474 days.

(21) Appl. No.: 13/173,989

(22) Filed: Jun. 30, 2011

(65) Prior Publication Data

US 2012/0013458 A1  Jan. 19, 2012

(30) Foreign Application Priority Data

Jul. 13, 2010  (JP) ................. 2010-158604

(51) Int. Cl.
*B60C 23/00* (2006.01)
*B60C 23/02* (2006.01)
*B60Q 1/00* (2006.01)

(52) U.S. Cl.
USPC ........ 340/447; 340/442; 340/445; 340/425.5; 340/438; 73/146; 73/146.2

(58) Field of Classification Search
USPC ........ 340/442–448, 425.5, 438, 686.1, 686.6; 73/146–146.8
See application file for complete search history.

(56) References Cited

U.S. PATENT DOCUMENTS

| | | | | |
|---|---|---|---|---|
| 3,142,178 A | * | 7/1964 | Vernon et al. | 73/146 |
| 4,773,011 A | * | 9/1988 | VanHoose | 701/29.3 |
| 5,936,155 A | * | 8/1999 | Francois et al. | 73/129 |
| 6,271,748 B1 | * | 8/2001 | Derbyshire et al. | 340/442 |
| 6,545,599 B2 | * | 4/2003 | Derbyshire et al. | 340/442 |
| 6,633,229 B1 | * | 10/2003 | Normann et al. | 340/447 |
| 6,710,708 B2 | * | 3/2004 | McClelland et al. | 340/442 |
| 6,737,965 B2 | * | 5/2004 | Okubo | 340/445 |
| 6,750,761 B1 | * | 6/2004 | Newman | 340/442 |
| 6,825,758 B1 | * | 11/2004 | Laitsaari | 340/442 |
| 6,906,624 B2 | * | 6/2005 | McClelland et al. | 340/442 |

(Continued)

FOREIGN PATENT DOCUMENTS

| | | |
|---|---|---|
| JP | 2000233615 A | 8/2000 |
| JP | 2003151064 A | 5/2003 |

(Continued)

OTHER PUBLICATIONS

Korean Office Action of corresponding Korean Patent Application No. 10-2011-0068576, dated on Feb. 14, 2013.

(Continued)

*Primary Examiner* — Daniel Wu
*Assistant Examiner* — Kam Ma
(74) *Attorney, Agent, or Firm* — Global IP Counselors, LLP

(57) ABSTRACT

A tire information monitoring system includes a transmitting device, provided in a tire cavity region, for transmitting tire information, a receiving device, provided in a vehicle body, that receives the tire information from the transmitting device and determines a tire condition based on the tire information, and a setting device that transmits identification information and a criterion to the receiving device so as to set the identification information of the transmitting device and the criterion of the tire information used for determining the tire condition by the receiving device. The setting device can be a mobile telecommunication terminal device for setting the identification information and the criterion in the receiving device using a program downloaded via an external network.

14 Claims, 8 Drawing Sheets

(56) References Cited

U.S. PATENT DOCUMENTS

| | | | |
|---|---|---|---|
| 6,927,680 B2* | 8/2005 | Kusunoki et al. | 340/442 |
| 7,079,033 B2* | 7/2006 | Itou | 340/572.3 |
| 7,113,981 B2* | 9/2006 | Slate | 709/217 |
| 7,301,444 B2* | 11/2007 | Matsuura | 340/442 |
| 7,330,104 B2* | 2/2008 | Tsukamoto et al. | 340/442 |
| 7,373,228 B2* | 5/2008 | Taguchi et al. | 701/29.3 |
| 7,486,958 B2* | 2/2009 | Sheha et al. | 455/456.3 |
| 7,577,500 B2* | 8/2009 | Nihei et al. | 701/1 |
| 7,589,619 B2* | 9/2009 | DeKeuster et al. | 340/442 |
| 7,623,025 B2* | 11/2009 | Miller | 340/426.33 |
| 8,009,027 B2* | 8/2011 | Thomas et al. | 340/447 |
| 8,009,028 B2* | 8/2011 | Uesaka et al. | 340/450.2 |
| 8,049,606 B2* | 11/2011 | Braun et al. | 340/447 |
| 8,149,100 B2* | 4/2012 | Gila et al. | 340/447 |
| 8,186,208 B2* | 5/2012 | Matsumura | 73/146.4 |
| 2002/0003474 A1* | 1/2002 | McClelland et al. | 340/442 |
| 2002/0030592 A1* | 3/2002 | Hakanen et al. | 340/442 |
| 2002/0075145 A1* | 6/2002 | Hardman et al. | 340/442 |
| 2002/0084895 A1* | 7/2002 | Dixit et al. | 340/447 |
| 2003/0227379 A1* | 12/2003 | Itou | 340/442 |
| 2004/0049329 A1* | 3/2004 | Yamamoto et al. | 701/29 |
| 2004/0090324 A1* | 5/2004 | Hayashi et al. | 340/445 |
| 2004/0206168 A1* | 10/2004 | Katou et al. | 73/146 |
| 2004/0248555 A1* | 12/2004 | Herrmann et al. | 455/411 |
| 2005/0187667 A1* | 8/2005 | Vredevoogd et al. | 701/1 |
| 2006/0139157 A1* | 6/2006 | Takao et al. | 340/442 |
| 2007/0279203 A1* | 12/2007 | Thomas et al. | 340/447 |
| 2008/0129478 A1* | 6/2008 | Fink et al. | 340/447 |
| 2008/0252435 A1* | 10/2008 | Chien et al. | 340/438 |
| 2009/0109012 A1* | 4/2009 | Petrucelli | 340/445 |
| 2009/0199629 A1* | 8/2009 | Matsumura | 73/146.4 |
| 2011/0034128 A1* | 2/2011 | Kirsch | 455/41.3 |
| 2012/0013458 A1* | 1/2012 | Kanenari | 340/447 |
| 2012/0212334 A1* | 8/2012 | Rigney et al. | 340/442 |
| 2013/0106596 A1* | 5/2013 | Mouchet | 340/445 |
| 2013/0278424 A1* | 10/2013 | Knowles | 340/572.1 |

FOREIGN PATENT DOCUMENTS

| | | |
|---|---|---|
| JP | 2004-314726 A | 11/2004 |
| JP | 2005022602 A | 1/2005 |
| JP | 2009137548 A | 6/2009 |
| JP | 2009184614 A | 8/2009 |
| JP | 2010-036647 A | 2/2010 |
| KR | 2002-0095139 A | 12/2002 |

OTHER PUBLICATIONS

ISO/IEC 18004, International Standard, Information technology—Automatic identification and data capture techniques—Bar code symbology—QR Code, Reference No. ISO/IEC 18004: 2000 (E), First edition Jun. 15, 2000.

Translation for Japanese office action of the corresponding No. JP2010-158604 dated Mar. 11, 2014.

* cited by examiner

1=FL, 2=FR...

TIRE INFORMATION MONITORING SYSTEM AND SETTING METHOD FOR A TIRE INFORMATION MONITORING SYSTEM

CROSS-REFERENCE TO RELATED APPLICATIONS

This application claims priority to Japanese Patent Application No. JP2010-158604, filed on Jul. 13, 2010. The entire disclosure of Japanese Patent Application No. JP2010-158604 is hereby incorporated herein by reference.

BACKGROUND

1. Field of the Invention

The present invention relates to a tire information monitoring system for monitoring tire information regarding a tire condition, and a setting method for setting information and a criterion of the tire information monitoring system.

2. Background Information

Conventionally, inspecting and managing air pressure of tires mounted on vehicles has been desirable from the perspectives of enhancing tire durability, wear resistance, fuel economy, riding comfort, and driving performance. As a result, various tire pressure monitoring systems (TPMS) have been suggested. Generally, in these systems, air pressure in tires is monitored by detecting the air pressure information of a tire assembled on a wheel, providing a transmitting device for transmitting this information in a tire cavity region of each of the tires, and acquiring the air pressure information of each tire from the transmitting devices.

In order to identify from which tire (which is assembled on a wheel) the air pressure information has been transmitted, communication information including identification information of the transmitting device and the air pressure information of the tire is transmitted by the transmitting device. A receiving device can identify from which tire (which is assembled on a wheel) the transmitted information originated based on the identification information of the transmitting device included in the communication information. The receiving device uses a table in which the identification information of the transmitting device and mounting position information of the wheels is associated in order to obtain the mounting position information from the identification information. Therefore, identification information of the transmitting device and the mounting position information of the wheels are associated prior to beginning operation of the system.

On the other hand, the receiving device used in such a system for receiving the air pressure information is installed, for example, in a cabin of a vehicle, and specifically in a location that is within the line of sight of the driver. Therefore, it is desirable that the receiving device be small and that manufacturing costs thereof be low. Thus, from the perspectives of reducing size and lowering manufacturing costs, it is not desirable to provide the receiving device with input operation features such as numeric key pads, touch panels or the like for performing the tasks described above.

Japanese Unexamined Patent Application Publication No. 2004-314726A describes a wheel information acquisition system in which air pressure information is transmitted from a transmitting device provided on a wheel mounted on a vehicle and received by a receiving device, so that an identification of a mounting position of a wheel having the air pressure information of the tire received by the receiving device can be confirmed. In this type of system, the air pressure information of a tire is transmitted wirelessly along with indigenous identification information from a first communication device provided on a wheel. The transmitted air pressure information and the identification information of the tire are received by a second communication device provided on a vehicle body on which the wheel is mounted. At this time, a setting device for setting vehicle mounting position information, which is used to acquire a mounting position of the wheel (on the vehicle body) having the tire air pressure information in the second communication device, is used.

Specifically, this setting device acquires the identification information that the first communication device holds, and wirelessly transmits the identification information and mounting position information set and input for the wheel on the vehicle body to the second communication device. This causes the second communication device to associate the identification information and the mounting position information with each other, and to set and register the result of this association.

However, when associating, in order to communicate with the setting device, the first communication device of the system described above is provided with receiving functionality for receiving communications from the setting device. Thus, the first communication device that is attached to the wheel has both transmission functionality and receiving functionality, which leads to a complex configuration and increased costs. Additionally, the setting device is a dedicated device for wirelessly transmitting and receiving to/from the first communication device and to/from the second communication device. Therefore, a dedicated setting device for use in the system described above must be fabricated, which leads to a complex system and increased manufacturing costs.

SUMMARY

Therefore, an object of the present technology is to provide a tire information monitoring system and a setting method for a tire information monitoring system without using a dedicated device for the setting operation such as in the conventional technology described above, wherein the configuration can be simplified, manufacturing costs can be reduced, and the efficiency of setting operations can be increased.

In view of the state of the known technology, one aspect of the present invention provides a tire information monitoring system for monitoring tire information regarding a tire condition. The tire information monitoring system includes a transmitting device provided in a tire cavity region for transmitting the tire information, a receiving device provided in a vehicle body on which a tire is mounted that receives the tire information from the transmitting device and determines a tire condition based on the tire information, and a setting device for transmitting identification information and a criterion so that the identification information of the transmitting device transmitting the tire information and the criterion of the tire information used for the determination of the tire condition that is performed by the receiving device are set. The setting device can be a mobile telecommunication terminal device for designating and transmitting the identification information and the criterion to the receiving device using a program downloaded via an external network.

Preferably, the identification information can be displayed on a housing surface of the receiving device, and the mobile telecommunication terminal device includes a photographing unit for photographing an image and an analysis unit for acquiring information from the photographed image. The analysis unit acquires the identification information by analyzing the image of the identification information photographed by the photographing unit using the analysis unit, and the mobile telecommunication terminal device transmits the acquired identification information to the receiving device. The identification information can be, for example, displayed as a two-dimensional matrix code.

The mobile telecommunication terminal device preferably can transmit position information of the vehicle where the tire is mounted and the transmitted position information is designated based on an order in which the image is photographed, an order in which the identification information is acquired, or an order in which the identification information is transmitted. Additionally, address information of a download site of the program can be displayed on the housing surface of the receiving device, and the mobile telecommunication terminal device downloads the program using the address information.

Furthermore, the mobile telecommunication terminal device can include a photographing unit for photographing an image and an analysis unit for acquiring information from the photographed image. The analysis unit acquires the address information by analyzing the image of the address information photographed by the photographing unit using the analysis unit, and the mobile telecommunication terminal device uses the acquired address information to download the program. The address information can be, for example, displayed as a two-dimensional matrix code.

The two-dimensional matrix code can further include identification information of the receiving device and manufacturing information of the receiving device; and the mobile telecommunication terminal device performs a user registration of the tire information monitoring system by transmitting the identification information and the manufacturing information of the receiving device and terminal information of the mobile telecommunication terminal device to an administrative server of the tire information monitoring system via at least the external network. The receiving device may issue an alert via audio information of a nature of the determination results depending on the determination results of the tire condition.

Additionally, another aspect of the present invention provides a setting method for a tire information monitoring system for setting information and a criterion in a receiving device of a tire information monitoring system for monitoring tire information regarding a tire condition. The setting method includes operating a setting device provided in a tire cavity region to acquire identification information of a transmitting device transmitting tire information and a criterion of the tire information used for the determination of the tire condition that is performed by the receiving device. The setting device can further transmit the acquired identification information and the criterion to the receiving device. The setting device can be a mobile telecommunication terminal device for designating and transmitting the identification information and the criterion to the receiving device using a program downloaded via an external network.

The identification information can be displayed on a housing surface of the receiving device, and the mobile telecommunication terminal device includes a photographing unit for photographing an image and an analysis unit for acquiring information from the photographed image. The analysis unit can acquire the identification information by analyzing the image of the identification information photographed by the photographing unit using the analysis unit, and the mobile telecommunication terminal device transmits the acquired identification information to the receiving device.

With the tire information monitoring system and method described above, the configuration can be simplified and manufacturing costs can be reduced. Moreover, the efficiency of setting operations can be increased.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Embodiments of a tire information monitoring system and method for setting the tire information monitoring system are described in detail below.

Figure 1:
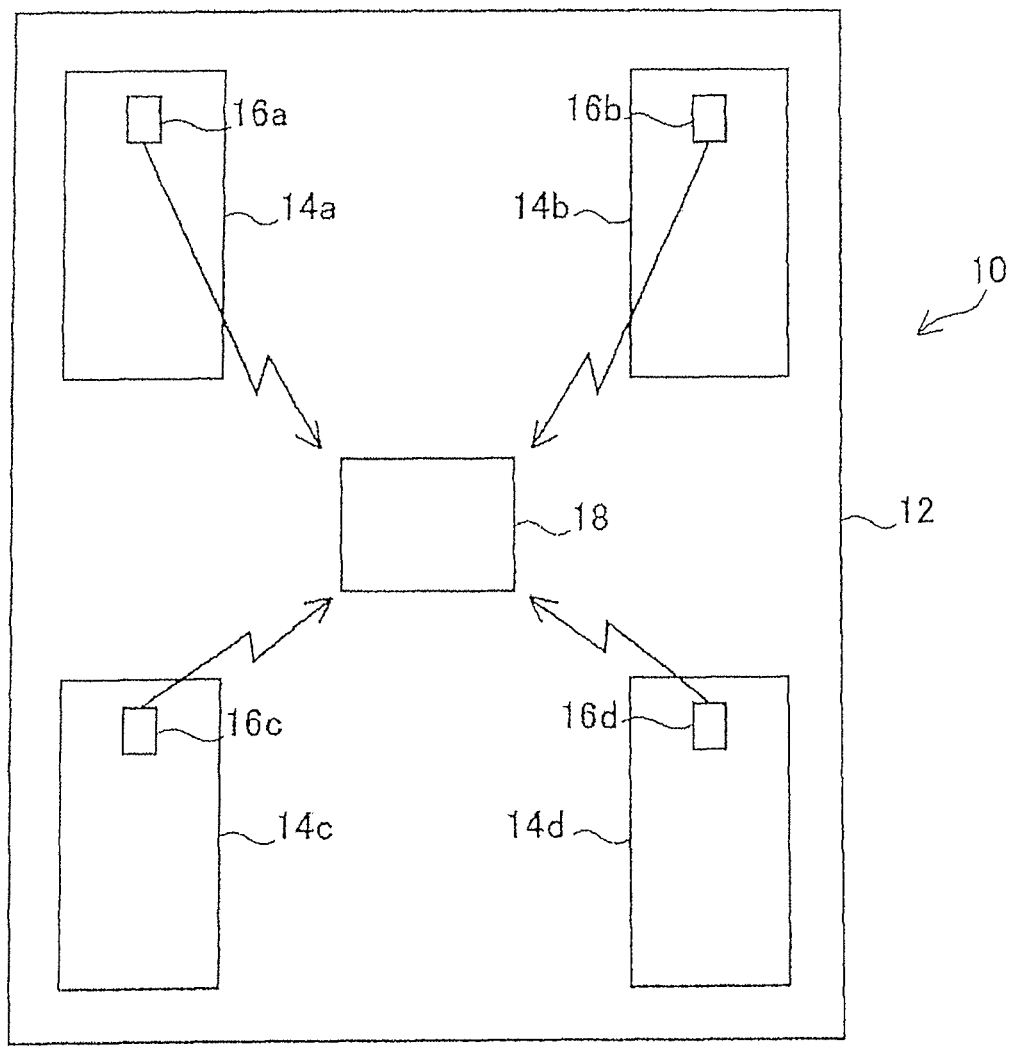
FIG. 1 illustrates an overview of a tire air pressure monitoring system that is an embodiment of the tire information monitoring system.

FIG. 1 illustrates an overview of a disclosed embodiment of a tire air pressure monitoring system 10. The tire air pressure monitoring system (hereinafter referred to as the "system") 10 is installed in a vehicle 12. The system 10 includes air pressure information transmitting devices (hereinafter referred to as the "transmitting devices") 16a, 16b, 16c, and 16d provided in each tire cavity region of tires 14a, 14b, 14c, and 14d of wheels on the vehicle 12; and a monitoring device (receiving device) 18.

Figure 2A:
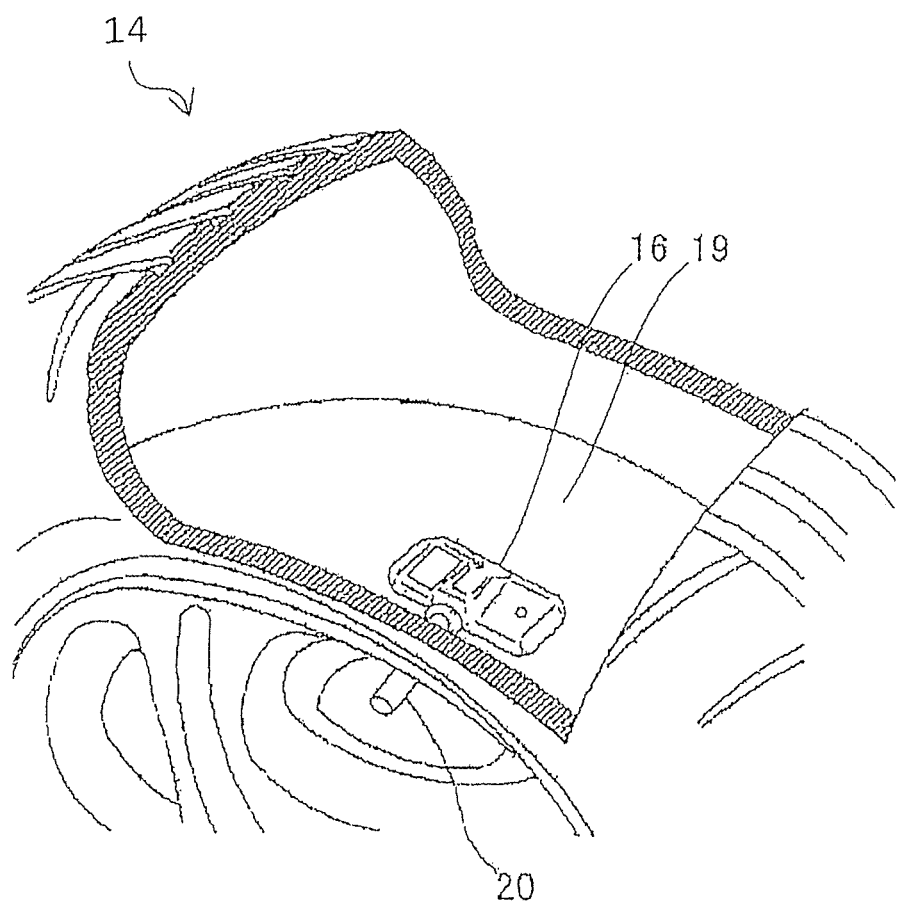
FIG. 2A illustrates an example of a method for affixing the transmitting device illustrated in FIG. 1 in the tire cavity region.

Each of the transmitting devices 16a, 16b, 16c, and 16d detect information regarding the air pressure to which the tire cavity region, surrounded by the tire and the rim, is filled as tire information; and wirelessly transmits the tire information to the monitoring device 18. In FIG. 2A, the "tires 14a, 14b, 14c, and 14d" are identified as "tire 14" since each of the tire 14a, 14b, 14c, and 14d are the same or substantially the same. Also, the "transmitting devices 16a, 16b, 16c, and 16d," will be abbreviated and referred to as the "transmitting device 16" since each of the transmitting devices 16a, 16b, 16c, and 16d are the same or substantially the same.

Figure 2B:
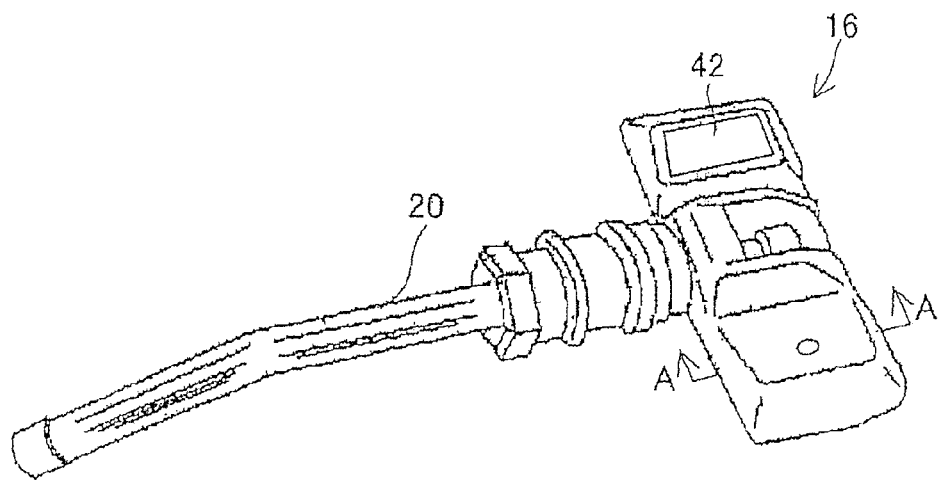
FIG. 2B illustrates an example of the transmitting device illustrated in FIG. 1.

FIG. 2A illustrates an example of a method for affixing the transmitting device 16. FIG. 2B is a perspective view illustrating an example of the transmitting device 16 illustrated in FIG. 2A in which the transmitting device 16 is integrated with a tire valve 20 of a tire 14. The transmitting device 16 is provided on an end of the tire valve 20 that extends toward the tire cavity region side and is affixed and disposed in the tire cavity region by mechanically affixing the tire valve 20 to a rim 19.

Figure 2C:
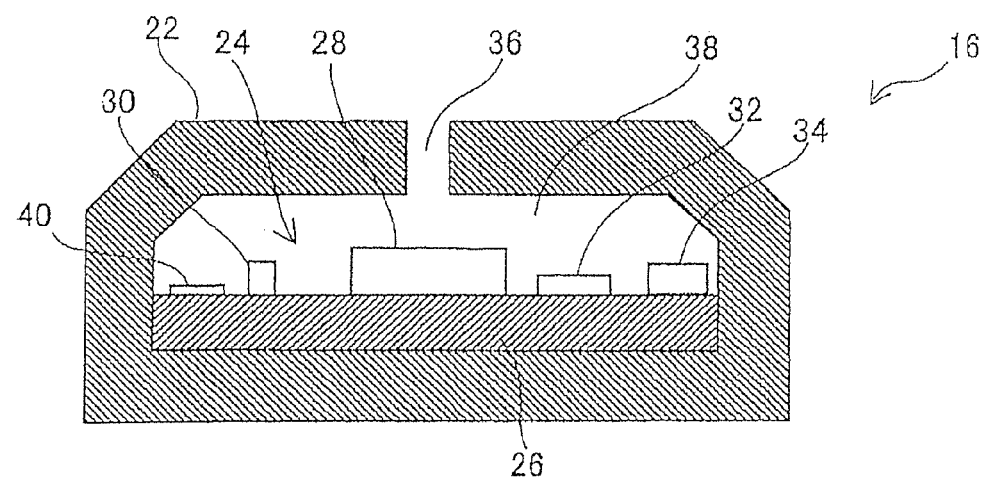
FIG. 2C illustrates an example of an internal configuration of the transmitting device illustrated in FIG. 2B.
Figure 3:
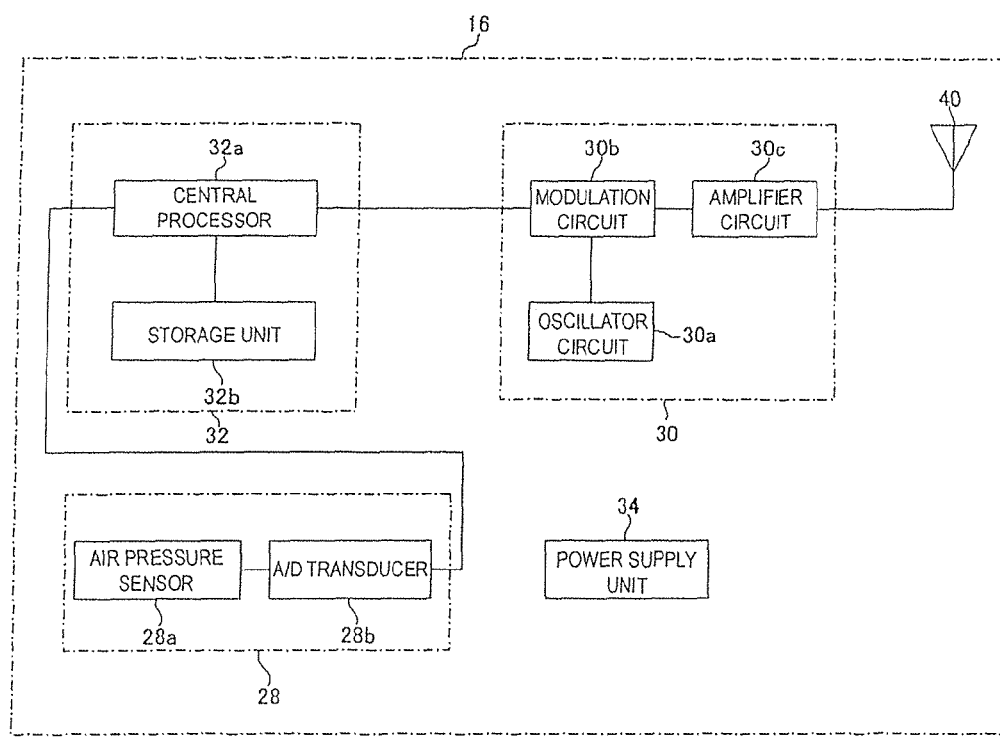
FIG. 3 is a block diagram illustrating an example of a circuitry configuration of the transmitting device illustrated in FIG. 2C.

FIG. 2C is a cross-sectional view of the transmitting device 16 taken along a line A-A illustrated in FIG. 2B. FIG. 3 is a block diagram illustrating an example of a circuitry configuration of the transmitting device 16. As illustrated in FIG. 2C, the transmitting device 16 includes a housing 22 and a circuit 24 that is provided in the housing 22. The circuit 24 includes a board 26, a sensor unit 28 provided on the board 26, a transmitter 30, a processing unit 32, a power supply unit 34, and an antenna 40.

The sensor unit 28 includes an air pressure sensor 28a (see FIG. 3) and an A/D transducer 28b (see FIG. 3). The air pressure sensor 28a detects the air pressure of an internal space 38 of the housing 22 and outputs the detected pressure as a pressure signal. The internal space 38 in the housing 22 is in communication with space of the tire cavity region via a through-hole 36 that penetrates the housing 22. The A/D transducer 28b converts the pressure signal output from the air pressure sensor 28a and outputs a pressure datum.

The processing unit 32 includes a central processor 32a and a memory unit 32b. The central processor 32a operates based on a program stored in semiconductor memory of the memory unit 32b. When the central processor 32a is powered and operated, the transmitter 30 is controlled so as to transmit the pressure datum received from the sensor unit 28 as the air pressure information to the monitoring device 18 via the transmitter 30 at a predetermined time interval such as, for example, every five minutes. Unique identification information of the transmitting device 16 is stored in advance in the memory unit 32b and the central processor 32a is controlled so as to transmit the pressure datum and the identification information to the monitoring device 18.

The memory unit 32b includes Read Only Memory (ROM) in which the program that operates the central processor 32a is stored and rewritable non-volatile memory such as, for example, Electrically Erasable Programmable Read-Only Memory (EEPROM) or the like. The unique identification information of the transmitting device 16 is stored in a region of the memory unit 32b that is not rewritable.

The transmitter 30 includes an oscillator circuit 30a, a modulation circuit 30b, and an amplifier circuit 30c. The oscillator circuit 30a generates a carrier wave signal, for example, a radio frequency (RF) signal having a frequency in the 315 MHz band. The modulation circuit 30b generates a transmission signal by using the pressure datum and the unique identification information of the transmitting device 16 received from the central processor 32a to modulate a carrier wave signal. Examples of a modulation method that can be used include amplitude shift keying (ASK), frequency modulation (FM), frequency shift keying (FSK), phase modulation (PM), phase shift keying (PSK), and the like. The amplifier circuit 30c amplifies the transmission signal generated by the modulation circuit 30b, and wirelessly transmits the transmission signal to the monitoring device 18 via the antenna 40. Examples of the power supply unit 34 include secondary batteries that semi-permanently supply power to the sensor unit 28, the transmitter 30, and the processing unit 32.

A display unit 42 of the identification information of the transmitting device 16 is provided on the surface of the housing 22 (see FIG. 2B). The display unit 42 of the identification information is photographed using a mobile phone 70 described below, and the identification information is acquired in the mobile phone 70 by analyzing the photographed image. The identification information is, for example, displayed as a two-dimensional matrix code. A two-dimensional matrix code is preferable because accurate identification information can be acquired as a result of analyzing the image. Examples of the two-dimensional matrix code include QR codes and the like. The identification information may be displayed as alphanumerics, symbols, or the like in addition to being displayed as a two-dimensional matrix code.

It should be noted that while the transmitting device 16 of this embodiment detects the air pressure to which the tire cavity region is filled as the tire information related to the tire condition, the tire information may also be an ambient temperature of the air in the tire cavity region. Additionally, the tire information may include the air pressure and the ambient temperature of the air. Moreover, in addition to being affixed to the tire valve 20, the transmitting device 16 may be directly affixed to a surface inside the tire 14 that faces the tire cavity region or a surface of the rim 19 that faces the tire cavity region.

Figure 4:
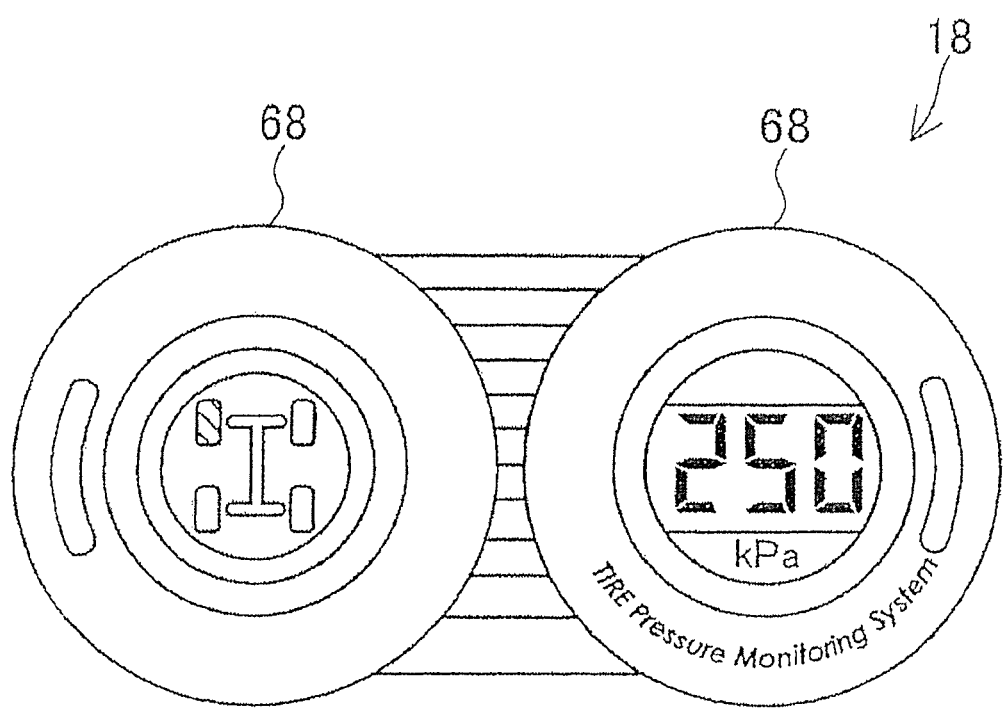
FIG. 4 is an external view illustrating an example of a monitoring device used in the tire air pressure monitoring system illustrated in FIG. 1.
Figure 5:
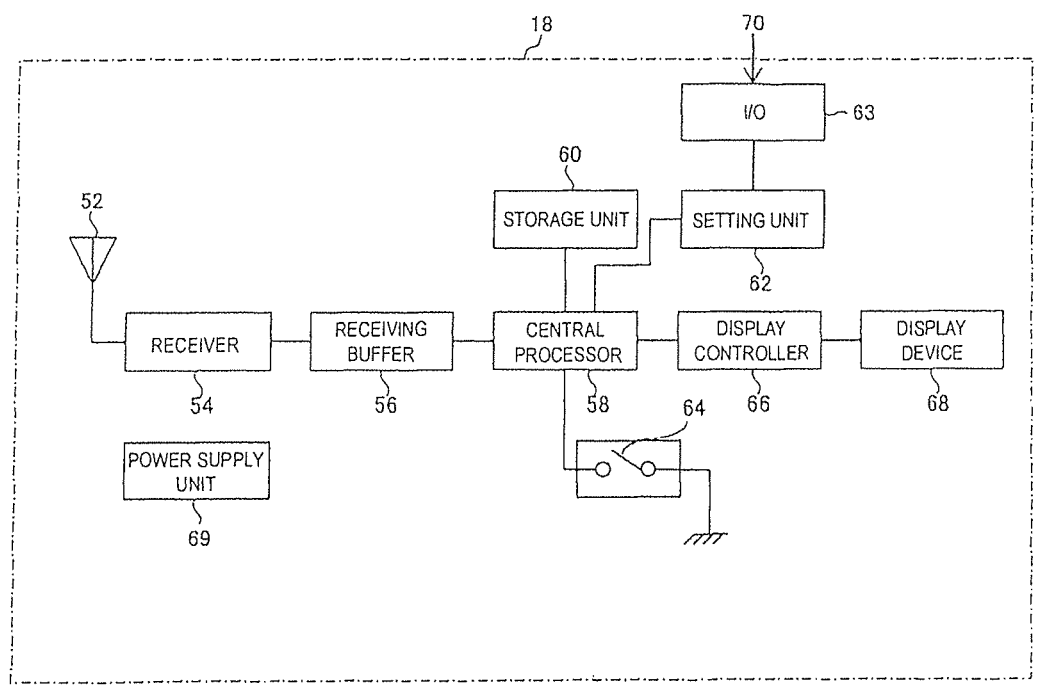
FIG. 5 is a block diagram illustrating a circuitry configuration of the monitoring device illustrated in FIG. 4.

FIG. 4 is an external view of the monitoring device 18. FIG. 5 is a block diagram illustrating a circuitry configuration of the monitoring device 18. The monitoring device 18 is provided in a vehicle body on which the tires 14a to 14d are mounted, for example at a location near the driver's seat of the vehicle 12. The monitoring device 18 receives the tire information from the transmitting device 16, determines the tire condition (e.g. low air pressure and the like) based on the tire information, and, based on the results of the determination, relays air pressure information to the driver. The monitoring device 18 includes an antenna 52, a receiver 54, a receiving buffer 56, a central processor 58, a memory unit 60, a setting unit 62, an I/O port 63, a switch 64, a display controller 66, a display device 68, and a power supply unit 69. It should be noted that the monitoring device 18 does not need to have a setting button for setting the information, criterion, and the like in the monitoring device 18, but rather a key/button of the mobile phone 70 described below that is wired to the monitoring device 18, or connected wirelessly to the monitoring device 18, can be used.

The antenna 52 is aligned to the same frequency as the transmission frequency of the transmitting device 16 and is connected to the receiver 54. The receiver 54 receives the transmission signal transmitted from the transmitting device 16, performs a demodulation process, and extracts the pressure datum and the identification information datum. These data are output to the receiving buffer 56.

The receiving buffer 56 temporarily stores the pressure datum and the identification information datum output from the receiver 54. The stored pressure datum and identification information datum are output to the central processor 58 in accordance with a command from the central processor 58.

The central processor 58 is primarily constructed of a CPU and operates based on a program stored in the memory unit 60. The central processor 58 monitors the air pressure of the tires 14a to 14d for each instance of identification information based on the received pressure datum and identification information datum. Specifically, the central processor 58 determines the presence of abnormalities based on the pressure datum. "Determines the presence of abnormalities" means, for example, determining abnormally low air pressure, or whether the tire has been punctured based on a sudden decline in air pressure over a short period of time. A criterion used in the determination (a threshold for determining the presence of an abnormality) is set using the setting unit 62 described below.

The central processor 58 outputs the results of the determination to the display controller 66 and relays the air pressure information to the driver by outputting the results for the determination to the display device 68 via the display controller 66. As illustrated in FIG. 4, the display device 68, for example, includes a display unit for visually displaying a position of the tire 14 and a display unit for visually displaying a number representing the air pressure at that position. Examples of the display device 68 include liquid crystal display devices, LED display devices, organic EL display devices, and the like. In the example illustrated in FIG. 4, the air pressure information of the tire of the front-left wheel is displayed as 250 kPa.

Furthermore, the central processor 58 initializes a communication protocol with the transmitting device 16 depending on information from the setting unit 62 and information from the switch 64. Additionally, based on the information from the setting unit 62, the central processor 58 stores, in the memory unit 60, the criterion for determining the presence of an abnormality and an association table in which the identification information of the transmitting device 16 is associated with the mounting position information on the vehicle of the wheels on which the transmitting device 16 is provided.

The memory unit 60 includes Read Only Memory (ROM) in which the program that operates the CPU of the central processor 58 is stored and non-volatile memory such as, for example, Electrically Erasable Programmable Read-Only Memory (EEPROM) or the like. A table including the communication protocol with the transmitting device 16 is stored in the memory unit 60 at the manufacturing stage. The transmitting device 16 and the monitoring device 18 communicate using this communication protocol at a stage of initial use. The communication protocol table contains information such as communication protocols, transfer bit rates, data formats, and the like, associated with the unique identification information of each transmitting device 16. Furthermore, an association table containing the identification information of the transmitting device 16 and the mounting position information is stored in the memory unit 60. This information can be modified freely using the setting unit 62 described below.

The setting unit 62 sets the identification information and also sets the association relationship between the identification information and the mounting position information. Furthermore, the setting unit 62 sets the criterion for determining the air pressure of the tire. The setting unit 62 need not include an input device such as a keyboard or the like, and instead is connected to the mobile phone 70 via the I/O port 63. The mobile phone 70 can be used to input a variety of information and criteria. In other words, the setting unit 62 can freely set, via input from the mobile phone 70, a variety of information and criteria. The switch 64 is used to command the central processor 58 to use default settings.

The display controller 66 instructs the display device 68 to associate the mounted position of the tire and the mounting position on the vehicle, and display the air pressure of the tire depending on the results of the determination received from the central processor 58. The display controller 66 also instructs the display device 68 to simultaneously display results of the determination that indicate that the tire is in a state of low air pressure. The displaying is performed by a screen that displays the mounting position information of the tire, specifically the mounting position information on the vehicle of the wheel on which the tire is mounted, and by a screen that displays the air pressure information of that tire as a number or the like. When the air pressure of the tire is outside the threshold of the criterion and has shifted so as to be in a state of abnormally low air pressure, a display color indicating the mounting position of the wheel and a display color indicating the numerical value of the air pressure on the screens change, for example, from green to red.

The power supply unit 69 can receive power supplied from a battery installed in the vehicle 12, converts the power to a voltage that is compatible with the various components of the monitoring device 18, and supplies the voltage to each component. The transmitting device 16 and the monitoring device 18 are configured as described above.

The mobile phone 70 can be wiredly or wirelessly connected to the setting unit 62 via the I/O port 63. The mobile phone 70 functions as a setting device that transmits the identification information and the criterion to the monitoring device 18 so that the monitoring device 18 sets the identification information of the transmitting device 16 transmitting the air pressure information of the tire and the air pressure criterion used for the determination of the tire condition performed by the monitoring device 18. Furthermore, the mobile phone 70 transmits mounting position information associated with identification information so that the mounting position information of the wheel on which the transmitting device 16 is provided is associated with the identification information in the monitoring device 18.

Figure 6:
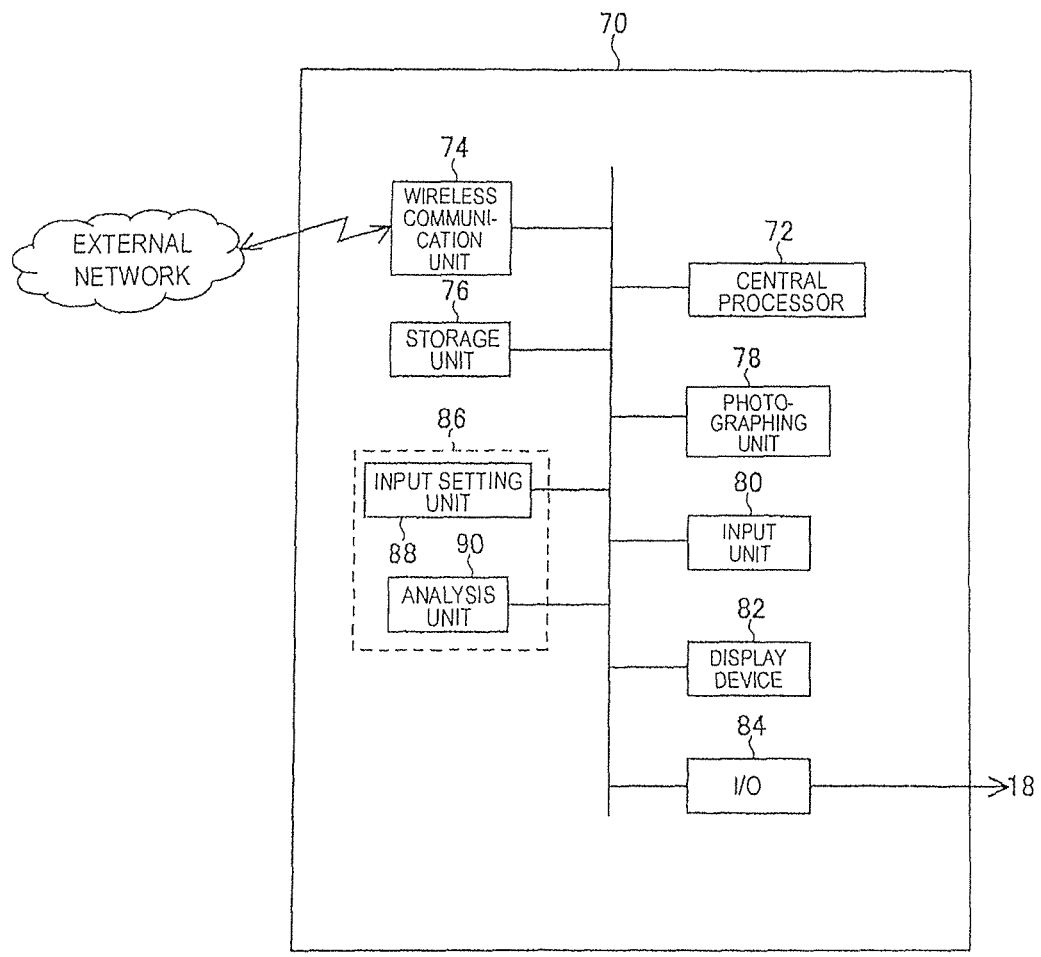
FIG. 6 is a block diagram of an example of a mobile phone used in the tire air pressure monitoring system illustrated in FIG. 1.

FIG. 6 is a block diagram illustrating a configuration of the mobile phone 70. In this embodiment, the mobile phone 70 is used as the setting device, but any mobile telecommunication terminal device such as a mobile phone, personal digital assistant (PDA), or the like may be used.

The mobile phone 70 specifically includes a central processor 72 containing a μ processor, a wireless communication unit 74, a memory unit 76, a photographing unit 78, an input unit 80, a display device 82, an I/O port 84, and a software module unit 86. The software module unit 86 includes an input setting unit 88 and an analysis unit 90. The software module unit 86 is a module formed by calling up and executing a program stored in the memory unit 76. In other words, software processing is performed in the input setting unit 88 and the analysis unit 90.

The wireless communication unit 74 is connected to a server via another mobile phone, the internet, or the like by means of a wireless communication network, and receives/transmits audio information, image information, and data. The central processor 72 administrates and controls the processing of each component of the mobile phone 70.

The memory unit 76 includes nonvolatile memory such as Read Only Memory (ROM), Electrically Erasable Programmable Read-Only Memory (EEPROM), and the like in which a variety of software is stored. The memory unit 76 stores, for example, a communication protocol performed by the wireless communication unit 74 or the like, and also stores a variety of software and a variety of information including the program.

The photographing unit 78 includes camera functionality for photographing images. The input unit 80 includes a key/button provided on a surface of the mobile phone 70, and input functionality by which an operator can input alphanumerics or the like by pushing the key/button.

The display device 82 is a display that is provided in the mobile phone 70 and displays an input display screen, photographed images, and the like. The I/O port 84 is provided so as to be connected to the monitoring device 18 via a cable. The set air pressure criterion, identification information, mounting position information of the wheel, and the like are wiredly or wirelessly transmitted to the monitoring device 18 via the I/O port 84. In this embodiment, the monitoring device 18 and the mobile phone 70 are shown as being wiredly connected, but communication may be performed via an infra-red connection or any other suitable wireless connection (e.g., Bluetooth).

The input setting unit 88 displays the input setting screen on the display device 82 by executing a program. The input setting unit 88 receives input of the criterion and various information by an operator viewing this display screen and pressing the key/button of the mobile phone 70. The criterion includes, for example, a minimum acceptable threshold for the air pressure, and is a parameter by which, when below the threshold, a state of abnormally low air pressure of a tire is determined.

In addition to a single threshold, the criterion may include a plurality of thresholds for determining states of the air pressure of a tire at a plurality of levels. The criterion is set at each monitored wheel. The reason that the criterion is set at each monitored wheel is because the system 10 is configured so as to have a high degree of versatility and not be limited to types and/or sizes of tires, because the standard air pressure of a tire used varies depending on the type and/or size of the tire and the criterion varies depending on the type and/or size of the tire. The analysis unit 90 is used to analyze a photographed image in order to acquire various information such as the identification information and the like from the image photographed using the photographing unit 78.

Figure 7:
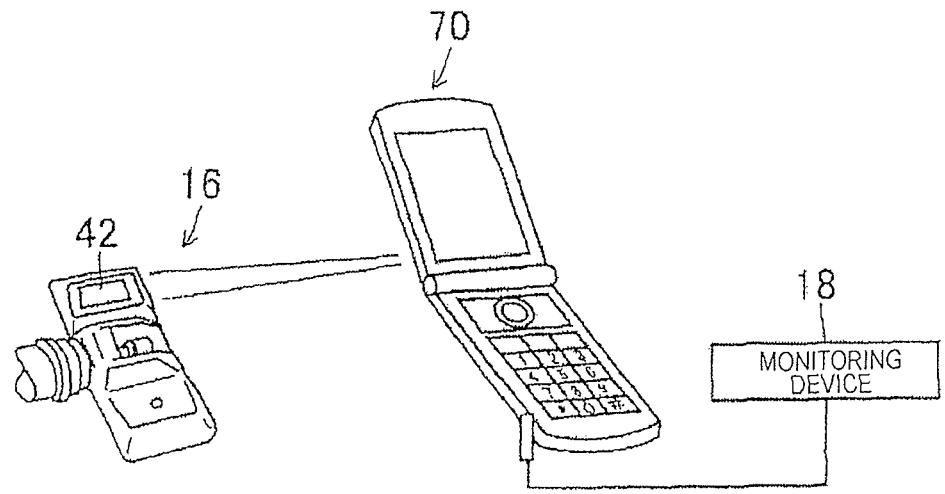
FIG. 7 illustrates an example of a method for setting using the mobile phone used in the tire air pressure monitoring system illustrated in FIG. 1.

FIG. 7 is a drawing illustrating an example of a method of setting the identification information of the transmitting device 16. In the method illustrated in FIG. 7, the display unit 42 of the identification information of the transmitting device 16 is provided on the housing surface of the transmitting device 16.

The identification information is displayed as a two-dimensional matrix code. Prior to the transmitting device 16 being installed in the tire, the two-dimensional matrix code is photographed using the photographing unit 78 and the photographed image is analyzed by the analysis unit 90. The identification information of the transmitting device 16 is extracted and acquired from the results of the analysis. The two-dimensional matrix code is, for example, displayed in monotone, and therefore the analysis unit 90 can accurately extract the identification information by performing binary coded processing with regards to brightness.

Figure 8:
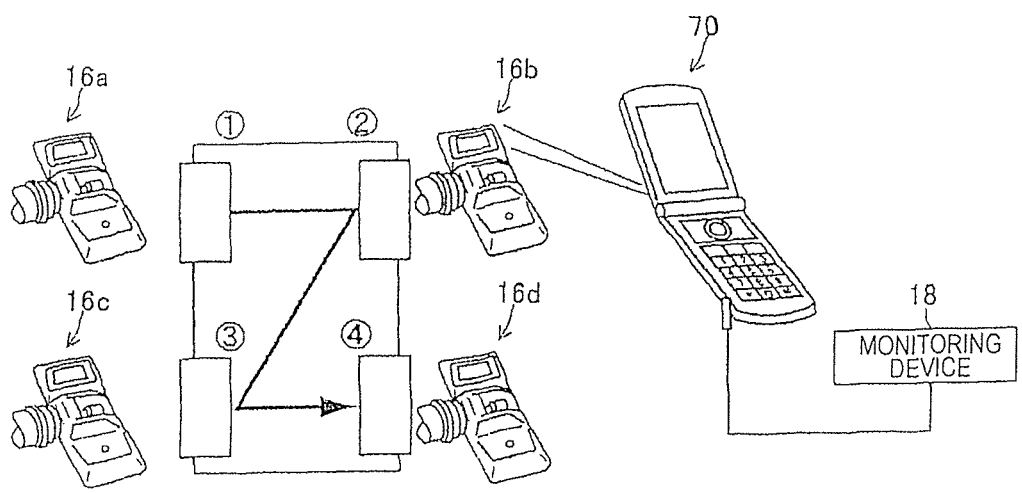
FIG. 8 is a drawing illustrating another example of a method for setting using the mobile phone used in the tire air pressure monitoring system illustrated in FIG. 1.

Additionally, as illustrated in FIG. 8, the mounting position information of the wheels mounted on the vehicle (front-left wheel, front-right wheel, rear-left wheel, and rear-right wheel) is designated based on a transmission order of the identification information transmitted to the monitoring device 18. For example, a first identification information photographed using the photographing unit 78 and transmitted to the monitoring device 18 is designated as the front-left wheel, a second identification information photographed and transmitted to the monitoring device 18 is designated as the front-right wheel, a third identification information photographed and transmitted to the monitoring device 18 is designated as the rear-left wheel, and a final identification information photographed and transmitted to the monitoring device 18 is designated as the rear-right wheel. It is sufficient that the mounting position information of the wheels mounted on the vehicle be designated based on the transmission order of the identification information transmitted to the monitoring device 18 and is not limited to the order described above. The transmission order of the identification information described above may be the "Z" shaped order illustrated in FIG. 8, or a clockwise or counterclockwise order.

It is preferable to designate the mounting position information based on the transmission order of the identification information in this way because association of the identification information and the mounting position information will be facilitated. It is also preferable that the mounting position information be designated based on an acquisition order of the identification information from the photographed images or on an order in which images are photographed, in place of the transmission order of the identification information. In these cases as well, the association of the identification information and the mounting position information can be facilitated.

In the examples shown in FIGS. 7 and 8, the identification information of the transmitting device 16 is displayed as a two-dimensional matrix code, but the present technology is not limited to this type of display. The identification information of the transmitting device 16 may be displayed as a one-dimensional barcode, or the like. Additionally, the identification information of the transmitting device 16 may be displayed as a numeral, a symbol, or the like. In such cases, the analysis unit 90 acquires the identification information by performing software processing for recognizing the numeral or symbol that is read.

Thus, the mobile phone 70 inputs the various information and criteria using the key/button of the mobile phone 70. Therefore, a dedicated device for setting operations such as that used conventionally is not used. Therefore, the configurations of the transmitting device 16 and the monitoring device 18 can be simplified and manufacturing costs thereof can be reduced. Additionally, since the criterion and the identification information is input by operating the key/button of the mobile phone 70 and the software processing, efficiency of the setting operation can be increased.

In such a system 10, the mobile phone 70 acquires the identification information of the transmitting device 16, that is to be provided in the tire cavity region and that transmits the tire information, and the criterion of the air pressure. The criterion is used for the determination of the tire condition performed by the monitoring device 18. The display unit 42 of the identification information is provided on the housing surface of the transmitting device 16 and the identification information is displayed thereon. The mobile phone 70 photographs the display unit 42 of the identification information using the photographing unit 78, and the identification information is acquired by the analysis unit 90 analyzing the photographed image. The mobile phone 70 acquires the criterion by input into the mobile phone 70 from the input unit 80. The mobile phone 70 transmits the acquired identification information and the criterion to the monitoring device 18.

The mobile phone 70 downloads such a program for input setting via an external network and stores the program beforehand in the memory unit 76. When using the mobile phone 70 to input the various information and the criterion, the mobile phone 70 calls up the program and displays the input setting screen. Here, the criterion is acquired via input by the operator, and the identification information is obtained through the photographing of the image of the display unit 42, an analysis of the results of the photographing of the image, and the like.

It should be noted that address information of a download site for the program on the external network is preferably displayed on the housing surface of the monitoring device 18. The mobile phone 70 uses the address information to download the program. The address information is, for example, displayed as a two-dimensional matrix code. In this case, the two-dimensional matrix code is photographed using the photographing unit 78 of the mobile phone 70, the photographed image is analyzed by the analysis unit 90, and the address information and manufacturing information is acquired.

Furthermore, manufacturing information of the monitoring device 18 (manufacturing site, date of manufacture, lot number, and the like) is included in the two-dimensional matrix code. The mobile phone 70 may be configured to perform a user registration of the tire information monitoring system by transmitting the identification information and the manufacturing information of the set monitoring device 18 and the terminal information of the mobile phone 70 to an administrative server of the tire information monitoring system via the external network. In addition, the mobile phone 70 may transmit information such as a user registration date, setting operation location, and the like to the server. An address of the server is included in the two-dimensional matrix code described above, and the address can be acquired from the photographed image.

By configuring the mobile phone 70 so that user registration is performed automatically, the server can perform a follow-up survey of a user and, furthermore, can manage information that is useful for the marketing of the system. Moreover, the mobile phone 70 may transmit the identification information of the transmitting device 16 to the server. In this case, the server can comprehensively manage the various information of the system 10 including that of the transmitting device 16 and the monitoring device 18. Thus, by displaying the address information of the server on the monitoring device 18, in addition to initializing the system 10 at initial mounting of the wheels on the vehicle, the program can be downloaded also when re-registering the system 10 when rotating the tires or replacing the transmitting device 16. If the address information is included in a user's manual of the monitoring device 18, or the like, the address information may become unobtainable due to loosing the user's manual.

Also, the monitoring device 18 need not have a setting button, and instead, the software module unit 86 of the mobile phone 70 and the input unit 80 can be provided with input functionality for setting. Thus, manufacturing costs are reduced because monitoring device 18 is not provided with a setting button feature. The display device 68 of the monitoring device 18 relays information visually, but may also relay audibly. For example, if below the minimum threshold set as the criterion, a sound such as an audible warning is issued. Such a configuration is advantageous because a display device is not needed. Therefore the installation location of the monitoring device 18 is not limited to within the line of sight of the driver and a high degree of freedom with regards to the installation location is obtained.

The tire information monitoring system and the setting method for a tire information monitoring system are described in detail above. However, it should be understood that the present technology is not limited to the above embodiments, but may be improved or modified in various ways within the scope of the present technology.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A tire information monitoring system for monitoring tire information regarding a tire condition, the tire information monitoring system comprising:
   a transmitting device provided in a tire cavity region and configured to transmit the tire information;
   a receiving device provided in a vehicle body on which a tire is mounted, the receiving device being configured to receive the tire information from the transmitting device and determine a tire condition based on the tire information; and
   a setting device configured to transmit identification information and a criterion so that the identification information of the transmitting device that transmits the tire information and the criterion of the tire information used for the determination of the tire condition that is performed by the receiving device are set, the setting device including a mobile telecommunication terminal device configured to designate and transmit the identification information and the criterion to the receiving device using a program downloaded via an external network;
   the receiving device including a housing surface configured to have address information of a download site of the program displayed thereon; and
   the mobile telecommunication terminal device being configured to download the program using the address information.

2. The tire information monitoring system according to claim 1, wherein
   the transmitting device includes a housing surface configured to have the identification information displayed thereon; and
   the mobile telecommunication terminal device comprises a photographing unit configured to photograph an image and an analysis unit configured to acquire information from the photographed image;
   the analysis unit being configured to acquire the identification information by analyzing the image of the identification information photographed by the photographing unit using the analysis unit, and the mobile telecommunication terminal device being configured to transmit the acquired identification information to the receiving device.

3. The tire information monitoring system according to claim 2, wherein
   the identification information is displayed as a two-dimensional matrix code.

4. The tire information monitoring system according to claim 3, wherein the mobile telecommunication terminal device is configured to transmit to the receiving device position information indicating a wheel location of the vehicle where the tire is mounted; and the position information is designated based on an order in which the image is photographed, an order in which the identification information is acquired, or an order in which the identification information is transmitted.

5. The tire information monitoring system according to claim 2, wherein the mobile telecommunication terminal device is configured to transmit to the receiving device position information indicating a wheel location of the vehicle where the tire is mounted; and the position information is designated based on an order in which the image is photographed, an order in which the identification information is acquired, or an order in which the identification information is transmitted.

6. The tire information monitoring system according to claim 1, wherein the mobile telecommunication terminal device comprises a photographing unit configured to photograph an image of the address information and an analysis unit configured to acquire information from the photographed image;

the analysis unit being configured to acquire the address information by analyzing the image of the address information photographed by the photographing unit using the analysis unit, and the mobile telecommunication terminal device is configured to use the acquired address information to download the program.

7. The tire information monitoring system according to claim 6, wherein the address information is displayed as a two-dimensional matrix code.

8. The tire information monitoring system according to claim 7, wherein the two-dimensional matrix code further comprises identification information of the receiving device and manufacturing information of the receiving device; and the mobile telecommunication terminal device is configured to perform a user registration of the tire information monitoring system by transmitting the identification information and the manufacturing information of the receiving device and terminal information of the mobile telecommunication terminal device to an administrative server of the tire information monitoring system via at least the external network.

9. The tire information monitoring system according to claim 8, wherein the receiving device is further configured to issue an alert via audio information of a nature of the determination results depending on the determination results of the tire condition.

10. The tire information monitoring system according to claim 1, wherein the address information is displayed as a two-dimensional matrix code.

11. The tire information monitoring system according to claim 10, wherein the two-dimensional matrix code further comprises identification information of the receiving device and manufacturing information of the receiving device; and the mobile telecommunication terminal device is configured to perform a user registration of the tire information monitoring system by transmitting the identification information and the manufacturing information of the receiving device and terminal information of the mobile telecommunication terminal device to an administrative server of the tire information monitoring system via at least the external network.

12. The tire information monitoring system according to claim 1, wherein the receiving device is further configured to issue an alert via audio information of a nature of the determination results depending on the determination results of the tire condition.

13. A method for setting information and a criterion in a receiving device of a tire information monitoring system that is configured to monitor tire information regarding a tire condition, the method comprising:

operating a mobile telecommunication terminal to download a program via an external network; and operating the mobile telecommunication terminal to acquire identification information pertaining to a transmitting device that is provided in a tire cavity region, the identification information including tire information and a criterion of the tire information that are used by a receiving device to determine the tire condition, the receiving device including a housing surface configured to have address information of a download site of the program displayed thereon; and operating the mobile telecommunication terminal to download the program using the address information and to designate and transmit the acquired identification information to the receiving device using the program.

14. The method according to claim 13, further comprising displaying an image of the identification information on a housing surface of the transmitting device;

operating a photographing unit included in the mobile telecommunication terminal device to photograph the image;

operating an analysis unit included in the mobile telecommunication terminal device to acquire identification information from the image by analyzing the image photographed by the photographing unit; and operating the mobile telecommunication terminal device to transmit the acquired identification information to the receiving device.

* * * * *